Sept. 15, 1959  L. L. UNDERWOOD  2,904,277
SPOOL MOUNT FOR KINETOSCOPES
Filed May 15, 1958
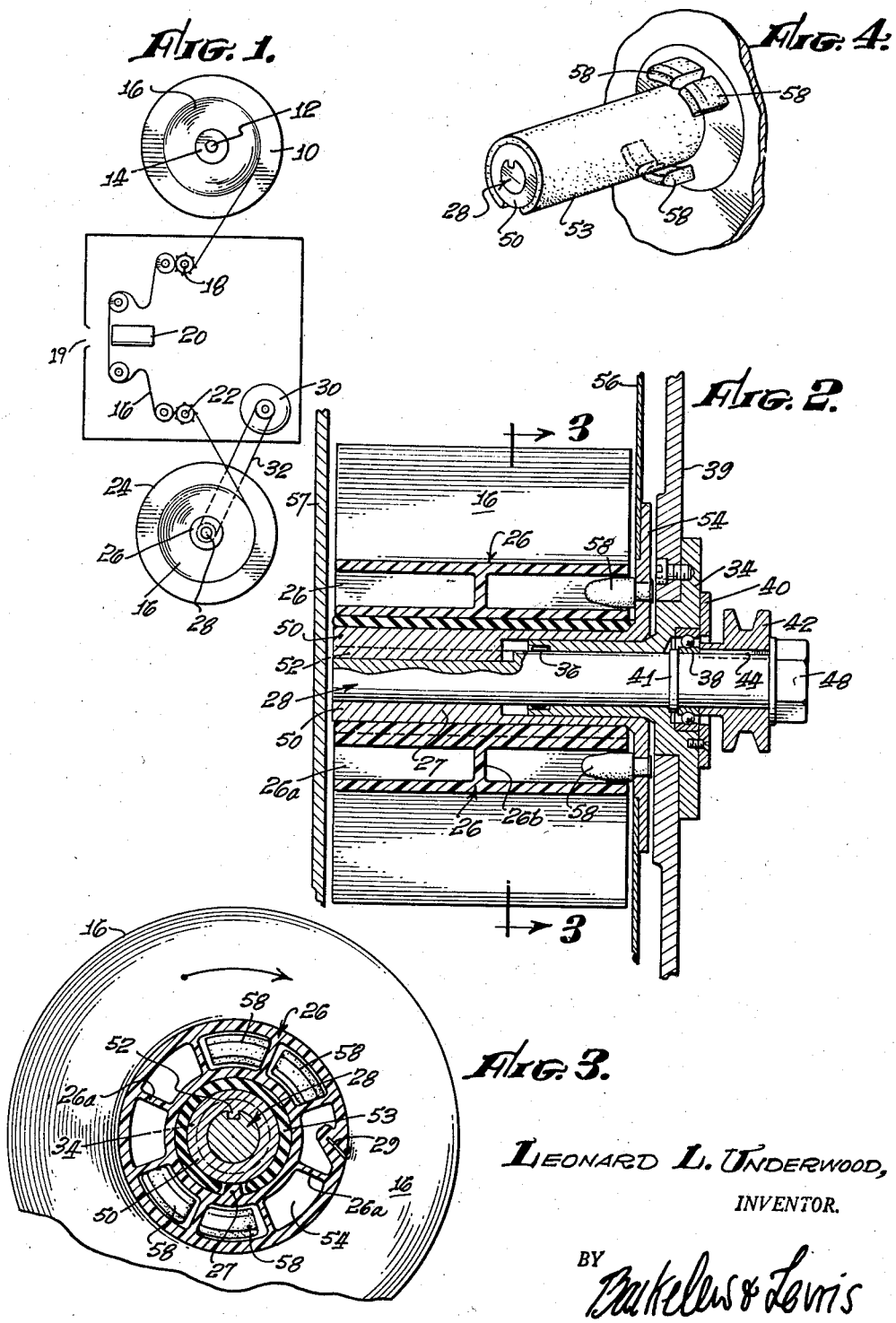
LEONARD L. UNDERWOOD,
INVENTOR.
BY Bakelew & Lewis

United States Patent Office 2,904,277
Patented Sept. 15, 1959

2,904,277
SPOOL MOUNT FOR KINETOSCOPES

Leonard L. Underwood, Sun Valley, Calif., assignor to Mitchell Camera Corporation, Glendale, Calif., a corporation of Delaware Application May 15, 1958, Serial No. 735,585

2 Claims. (Cl. 242—68.3)

This invention relates to a spool mount useful in kinetoscopes to support and to transmit torque to film spools. The invention is characterized by novel means whereby the film cores or spools, which are generally made from a brittle plastic material, are protected from damage due to vibration in or applied to the kinetoscope. The objects and advantages of the invention will be best understood from the following description of one illustrative embodiment thereof, in connection with the attached drawings, in which:

Fig. 1 is a schematic representation of a kinetoscope showing the film magazines and film feed system;

Fig. 2 is an axial section taken through the take-up spindle of a kinetoscope, showing the invention mounted on the spindle with a spool of film mounted on the invention;

Fig. 3 is a section taken on the line 3—3 of Fig. 2; and

Fig. 4 is a perspective of certain parts of Fig. 2.

Referring to Fig. 1 the film system of a typical kinetoscope generally includes a feed magazine 10 which contains a supply spindle 12 on which a spool or core 14 carrying film 16 may be mounted. The supply spindle has a negative drive (drag) applied thereto, usually by means of a friction clutch attached between the spindle and the magazine. Film from the supply magazine is threaded through a continuously driven sprocket 18, then through an intermittently driven mechanism, here indicated schematically at 20, to a continuously driven sprocket 22, and from there to a take-up core or spool 26 mounted on a take-up spindle 28 in take-up magazine 24. The take-up spool is continuously driven, for example, by a belt 32 from a motor 30 which contains a slip clutch in its coupling to belt 32. In the operation of the kinetoscope, the film from the supply magazine is pulled out at a constant speed by driven sprocket 18, being held taut by the negative drive (drag) on the supply spindle 12. Typically, intermittent mechanism 20 moves the film downward intermittently past the kinetoscope aperture 19, stopping between each movement long enough to allow the film behind the aperture to be exposed, or projected, as the case might be. After leaving the aperture, the film passes through a second continuously driven sprocket 22, which is driven at the same speed as sprocket 18. The speed of sprockets 18 and 22 is equal to the average speed of the intermittent mechanism 20, so that there will be no tendency for film to accumulate at either side of the intermittent. However, small loops of slack film are left between the driven sprockets and the intermittent mechanism to prevent breakage of the film by the intermittent movement. The take-up spool 26 is driven with slip at a higher film-winding speed than sprocket 22 to maintain the film taut therebetween. In the instant example the slip is illustratively supplied by a friction clutch drive between the motor 30 and belt 32.

Thus it can be seen that in the operation of a kinetoscope a continuous torque is maintained on both the feed and take-up spools by their respective spindles; a negative torque on the feed spool, and a positive torque on the take-up spool. Ordinarily the torque is coupled from the spindle to the spool by means of a central key (or keyway) in the spool or core which engages a corresponding keyway (or key) in a rigid member mounted on the spindle. This arrangement, however, has been found to have severe disadvantages in applications where large amounts of vibration are present; as, for example, in aircraft or missiles. In these applications it has been found that the spools, which are made from a rather brittle plastic, are often seriously damaged or completely destroyed. In accordance with this invention it has been found that such damage has been due not to the brittleness of the spools alone, but to a combination of the brittleness with a torque coupling system between the spindle and spools which acted to intensify the destructive effects of vibration. Therefore one principal object of this invention is to provide means supporting the spools on their spindles and coupling torque from the spindles to the spools in a manner which minimizes the destructive effect of vibration on the spools. Other objects and advantages of the invention will be apparent to those skilled in the art from the following description of one illustrative embodiment thereof in connection with Figs. 2, 3 and 4.

Referring to those figures, a take-up spindle 28 is journaled within a sleeve assembly 34 by needle bearings 36 and ball bearings 38. Sleeve assembly 34 is rigidly attached to the back 39 of a take-up magazine with the sleeve extending inside the magazine through a central hole cut in back 39. The outer race of bearings 38 is rigidly held in a recess cut into sleeve assembly 34 by an annular cover 40, which is attached to sleeve assembly 34. The inner race of the bearings 38 is pressed against an annular ridge 41 on spindle 28 by a drive wheel 42, which is pressed against the inner race by a nut 48 threaded on the end of spindle 28. Drive wheel 42 is rotatively connected with spindle 28 by a key 44 on the spindle engaging a key-way cut into the drive wheel. A drive belt, not shown, applies a torque to the drive wheel, which is coupled through key 44 to the spindle 28. The structure as thus far described is old, and it should be understood that this particular spindle arrangement is set forth for purposes of illustration only. The invention is equally adaptable to any type of spindle structure found in kinetoscopes.

The inventive portions of the structure comprise the means communicating torque between the spindle 28 and the spool or core 26. The core or spool, as disclosed in Figs. 2 and 3, is a standard type such as generally supplied by film manufacturers. It is made of a brittle plastic material with a central hole which may have a key 27 intended to engage a key-way to provide torque coupling between the spindle and spool. A series of recesses are formed in both ends of the spool to remove unnecessary weight, leaving a series of radial ribs 26a and a central annulus 26b connecting between the inner and outer cylindrical surfaces of the spool. A radially diagonal slot 29 extends longitudinally down the outer cylindrical surface. The film wound, or to be wound, on the spool is engaged at its end in the slot 29, and then wound by spool rotation in the direction indicated by the arrow in Fig. 3. The means communicating torque between the spindle and the spool comprise a cylindrical rigid central member 50 having an annular flange 54 at one end, and a central hole with a key at 52 at the other end. The central hole is slightly larger than the spindle, which has a keyway cut therein slightly larger than key 52. At the flanged end of member 50 a larger countersunk hole is drilled to provide clearance between central member 50 and stationary sleeve assembly 34. It will be understood that central member 50 is supported by spindle 28 along the length of the smaller central hole in member 50, and rotatively fixed to the spindle through key 52, but that member 50 does not normally contact stationary sleeve assembly 34. Therefore, the clearance between the countersunk hole and the sleeve is normally appreciably larger than the clearance between the keyed hole and the spindle; the latter being only large enough to permit easy sliding of the central member onto the spindle, while the former is large enough to preclude contact between the central member and the fixed sleeve on which the spindle is journaled. It will also be understood that the particular arrangement here shown and described is not essential to the invention, since any suitable arrangement which supports the central member on the spindle and rotatively connects it to the spindle may be employed.

A rubber sleeve 53 is bonded to the outer surface of the central member 50, with a longitudinal slot therein adapted to freely receive the key 27 of the film core or spool. The outer diameter of the rubber sleeve is slightly smaller than the central opening in the spool 26 such that the spool will fit freely over the sleeve, and the longitudinal slot is appreciably larger than key 27, so that key 27 does not contact any part of the rubber sleeve or central member 50 when centered in its slot. It is an important feature of this invention that no torque be applied to the spool 16 at the key 27. In accordance with this invention torque is applied from the central member 50 to the spool 26 by rubber or other resilient material drive fingers 58 which are bonded to the annular flange 54 and adapted to fit loosely within the end recesses formed in the spool. As shown in Fig. 3, the drive torque is applied to the spool solely by drive fingers 58 bearing against the radial ribs 26a of the spool. The film wound on the spool is guided at one edge by an annular plate 56 attached to annular flange 54, and at the other edge by the front 57 of the film magazine, which may be removed to remove the roll of film.

The advantages of the invention in preventing damage to the spool by vibration reside principally in the application of torque by the rubber fingers 58 alone and also by vibration insulation offered by the rubber sleeve 53. The sleeve 53 also isolates any key such as 27. It has been found, in accordance with this invention, that the shattering of spools in prior art devices was due not so much to the magnitude of vibrations, but to their concentration at a very small area along such a key as 27 where the key was pressed tightly against a rigid torque coupling element. The spool fits quite loosely except at its torque coupling point, so that if the torque is coupled at a concentrated point on the spool, as in past practice, there will be a high differential of vibration between the torque coupling point and the other portions of the spool. Thus it is the differential of vibration in the spool, rather than the absolute magnitude of the vibration, which tends to destroy the spool. In other words, the spool can stand high levels of vibration if the vibrations are distributed uniformly throughout the spool, but will fail at lower levels of vibration if there is an appreciable differential of vibration within the spool. The present invention, through the resilient compressive action of the driving fingers, minimizes vibrational impacts on the plastic core or spool.

Therefore the advantages of this invention derive from a combination of several factors: first, the point of torque application is moved radially outward on the spool, such that the same amount of torque can be coupled to the spool with less force pressing the drive elements on the spool. This reduces the amount of vibration coupled at the torque points. Next, the torque drive members are made of resilient material, which further reduces vibration at the torque points. Also, the torque is coupled at symmetrical points to the spool, so that vibration through the torque contacts will be distributed more evenly through the spool. Then, the torque is coupled to a relatively large area of the spool, reducing the concentration of vibration at any one point and thus the differential of vibration in the spool. And finally, the spool is supported vertically on a rubber sleeve which acts to insulate the entire spool from vibration, and to keep any vibration from being applied to a central key such as 27. It will be seen that any vibration coupled to the central key 27 will create a differential of vibration in the spool, due to the asymmetrical relation of the key to the spool.

Thus it can be seen that this invention provides a spool mounting which minimizes the destructive effect of vibration on film spools, and which is furthermore simple in construction and easily adaptable to existing kinetoscopes. And although this invention has been illustrated by reference to one specific embodiment thereof, it should be understood that many other embodiments are possible which do not depart from the spirit of this invention. This invention includes all such embodiments falling within the scope of the following claims.

I claim:

1. In a kinetoscope having a film magazine, a spindle therein, means exerting a torque on the spindle, and a film spool made of breakable material, said film spool having a central hole formed therein and recesses formed in the peripheral region of the ends thereof; a spool mount comprising a cylindrical central member having an annular flange at one end thereof, a sleeve of resilient material surrounding the cylindrical surface of the central member, the outside diameter of said sleeve being smaller than the diameter of the said central hole formed in the spool, a resilient finger attached to and projecting from said annular flange toward the other end of the central member, said resilient finger adapted to fit within a recess in the end of the spool when the spool is mounted on said sleeve, and said central member adapted to be mounted upon and driven by said spindle.

2. The combination defined in claim 1, and also including a second resilient finger attached to and projecting from said annular flange toward the other end of the central member, said second resilient finger adapted to fit within a recess in the end of the spool when the spool is mounted on said sleeve, and the two resilient fingers being substantially symmetrical with respect to the axis of said cylindrical central member.

References Cited in the file of this patent

UNITED STATES PATENTS

| 1,815,269 | Nydegger | July 21, 1931 |
| 2,091,525 | Runge | Aug. 31, 1937 |

FOREIGN PATENTS

| 715,582 | Germany | Jan. 2, 1942 |